United States Patent [19]

Rimmeir

[11] 4,321,859

[45] Mar. 30, 1982

[54] TOOL USED TO FACILITATE DEEP FAT FRYING

[76] Inventor: Paul Rimmeir, 10 S. Front St., Philadelphia, Pa. 19106

[21] Appl. No.: 191,047

[22] Filed: Sep. 25, 1980

[51] Int. Cl.³ ............................................. A47J 37/12
[52] U.S. Cl. ....................................... 99/416; 99/419; 99/447; 99/448; 99/450
[58] Field of Search ................. 99/349, 419, 450, 426, 99/403, 410–418, 352, 421 V, 347, 447, 448

[56] References Cited

U.S. PATENT DOCUMENTS

| | | | |
|---|---|---|---|
| 536,986 | 4/1895 | Dunlap | 99/421 V |
| 2,397,410 | 3/1946 | Deacon | 99/403 |
| 3,331,309 | 7/1967 | Proffitt | 99/411 |
| 3,908,532 | 9/1975 | Underwood | 99/419 |
| 4,217,817 | 8/1980 | Meamber | 99/349 |

FOREIGN PATENT DOCUMENTS

| | | | |
|---|---|---|---|
| 14406 | 6/1910 | United Kingdom | 99/413 |
| 1424924 | 2/1976 | United Kingdom | 99/417 |

*Primary Examiner*—Billy J. Wilhite
*Attorney, Agent, or Firm*—Caesar, Rivise, Bernstein & Cohen, Ltd.

[57] ABSTRACT

A device for use with a conventional deep fat frying basket to facilitate the frying of a porous mass of a food product, such as onion rings, located within the basket. The device comprises an apertured cover plate arranged for disposition over the mouth of the basket to lock the food product within the basket. Projecting downward from the underside of the cover plate are a pair of projecting members which extend for substantially the full depth of the basket. The members are rod-like and each includes a longitudinally extending, concavely relieved face. A handle is secured to the upper surface of the cover plate. The device is coated with a non-stick material.

8 Claims, 5 Drawing Figures

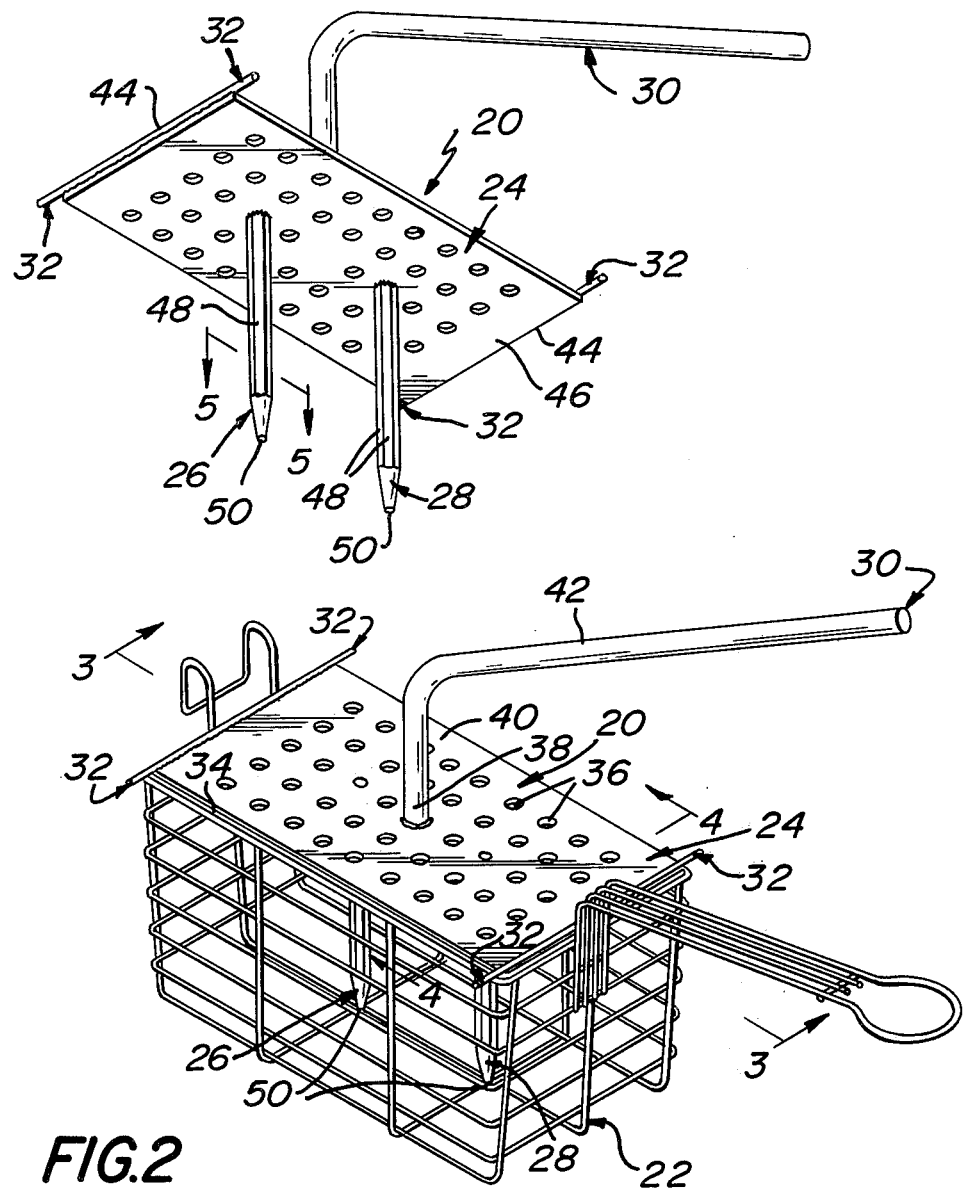

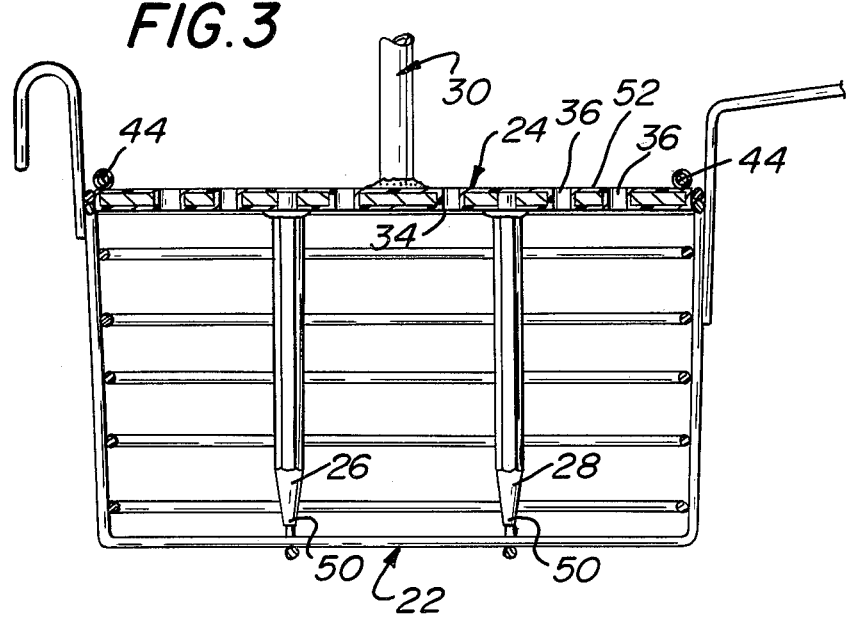
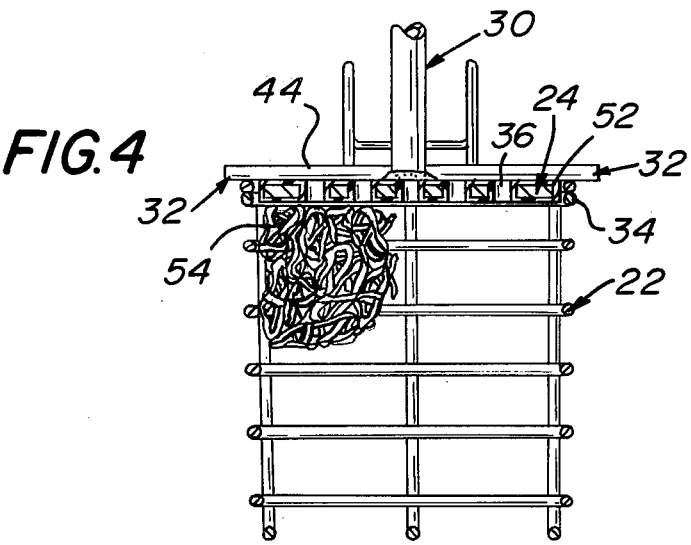
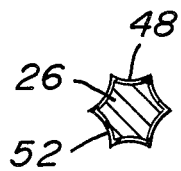

TOOL USED TO FACILITATE DEEP FAT FRYING

This invention relates generally to food preparation devices, and more particularly, to devices for use with conventional deep fat frying baskets.

The deep fat frying of food products, like onion rings, french fries, etc., on a commercial basis is normally accomplished by the use of conventional deep fat frying baskets. Such baskets are rectangular in shape and are constructed of a mesh of metal wire forming plural apertures and having an open top or mouth. The food to be cooked is placed within the basket and the basket then immersed within a bath of a heated cooking oil or fat.

In order to prevent the food from exiting the basket through the open mouth during the cooking process, it is a common practice to place an empty basket within the mouth of the basket holding the food being cooked and thus lock the food in place between the two nested baskets. Such a technique is frequently used in the cooking of french fries and onion rings.

The effect of cooking a mass of onion rings in the foregoing manner can result in the production of an onion ring loaf, i.e., a loaf-like mass of interlaced fried onion rings. Onion loaves have considerable commercial appeal providing they are not saturated with oil or fat. Unfortunately, using the aforementioned cooking technique frequently results in a greasy or oily onion loaf due to the incomplete cooking of the onion rings in the center of the loaf.

Accordingly, it is a general object of the instant invention to provide a device which overcomes the disadvantages inherent in the prior art deep fat frying baskets.

It is a further object of the instant invention to provide a device which can be utilized with conventional deep fat frying baskets to effectuate the complete frying of mass of a food product within the basket.

It is a further object of the instant invention to provide a device for use with conventional deep fat frying baskets to produce onion ring loaves which are fully cooked throughout and are not greasy.

These and other objects of the instant invention are achieved by providing a device for use with a conventional deep fat frying basket to facilitate the frying of a porous mass of a food product located within the basket. The device comprises a cover plate arranged for disposition over the mouth of the basket to lock the food product therein and at least one projecting member extending downward from the cover plate means into the basket for substantially the full depth thereof to facilitate the transfer of heated cooking oil through the mass of the food product.

Other objects and many of the attendant advantages of the instant invention will become readily apparent by reference to the accompanying drawing wherein:

FIG. 1 is a perspective view of the device of the instant invention;

FIG. 2 is a perspective view of the device shown in FIG. 1 disposed over the mouth of the conventional deep fat frying basket;

FIG. 3 is a sectional view taken along line 3—3 of FIG. 2;

FIG. 4 is a sectional view taken along line 4—4 of FIG. 2; and

FIG. 5 is an enlarged sectional view taken along line 5—5 of FIG. 1.

Referring now to the various figures of the drawing wherein like reference characters refer to like parts, there is shown at 20 in FIG. 1 a device constructed in accordance with the instant invention. The device 20 is arranged for use with a conventional deep fat frying basket like that shown at 22 in FIG. 2.

As can be seen in FIG. 1, the device 20 basically comprises a cover plate 24, a pair of projecting members 26 and 28, a handle 30 and four projecting fingers 32.

The cover plate 24 is rectangular in shape and is arranged to fit within the mouth 34 of the basket 22 to completely close the mouth. The plate 24 includes a plurality of openings or apertures 36. The handle comprises a rod-like extension 38 projecting normally from the central portion of the top surface 40 of the plate 24. The free end portion 42 of the handle 30 extends at an acute angle to the portion 38. A pair of rod-like elements 44 are secured parallel to the opposed end edges of the cover plate 24, with each rod-like member extending beyond the side edge of the plate to form the projecting fingers 32. The fingers 32 serve as a means for supporting the cover plate 24 on the mouth of the basket 22.

The projecting members 26 and 28 are secured to the underside surface 46 of the cover plate 24 and are spaced from each other by approximately the same distance as the distance from each member to the adjacent edge of the cover plate. Each of the projections 26 and 28 is a rod-like member whose external surface includes plural longitudinally extending faces 48. As can be seen in FIG. 5, each of the faces 48 is concavely relieved. The free end of each of the members 26 and 28 tapers to a rounded point at 50. Each of the members 26 and 28 is of sufficient length so that when the cover plate 24 is disposed on the mouth of the basket, the free end 50 of each member 26 and 28 is disposed immediately adjacent to the bottom of the basket 22, as can be seen in FIGS. 2 and 3.

The projections 26 and 28 serve as means for insuring that the interior of the mass of food, e.g., onion rings 54 (FIG. 4), held within the basket is fully cooked. To that end, each of the members 46 and 48 serve as means for conveying a flow of heated cooking oil through the mass of food 54 held within the basket. This is accomplished by the oil flowing longitudinally along the extending surfaces 48 of each of the members 26 and 28. Thus, when the entire basket is immersed within a heated bath of cooking oil, the oil is enabled to flow unimpeded through the openings 36 in the cover plate, along the projections 26 and 28 and out through the openings formed by the wire mesh of the basket 22 and vice versa.

In accordance with the preferred aspect of the invention, the device 20 is formed of a heavy and rugged, thermally conductive material, such as, steel. The weight of the device 20 insures that when it is located over the mouth of the basket 22, it remains in place, notwithstanding the bubbling action caused by the cooking of the food within the basket.

In order to prevent the adherence of cooked food material on the device 22, the device is preferably coated with a non-stick material 52, such as polytetrafluoroethylene sold under the trademark TEFLON by E. I. duPont de Nemours Company.

In FIG. 4, there is shown a portion of a mass of individual onion rings 54 held within the basket 22 by the device 20 for deep fat frying to form an onion ring loaf.

In the interest of clarity, the projections 26 and 28 have been omitted from FIG. 4.

It must be understood that to form an onion ring loaf, a sufficient quantity of onion rings must be disposed within the basket to completely fill the basket, preferably to slight overflowing. The device 20 is then disposed on the basket as shown in FIG. 2 which compresses the mass of onion rings together slightly within the basket. The basket is then lowered into a bath of heated oil or fat. The heated oil is enabled to flow readily through the interior of the mass of onion rings, via the surfaces of the projections 26 and 28, to fully cook the rings in the interior of the mass. Once the loaf is sufficiently cooked, the basket with the device 20 disposed thereon is lifted from the frying bath to drain the oil from the loaf. After the loaf has drained sufficiently, the device 20 is removed from the basket by grasping the handle 30. The cooked onion loaf can then be removed from the basket by merely inverting the basket.

As will be appreciated from the foregoing, the device of the instant invention is simple in construction and serves as an effective means for holding food products within a conventional deep fat frying basket during the frying process, while also insuring that the heated cooking oil flows readily through the entire interior of the basket to insure that all of the material in the basket is fully cooked.

Without further elaboration, the foregoing will so fully illustrate my invention that others may, by applying current or future knowledge, readily adapt the same for use under various conditions of service.

What is claimed as the invention is:

1. A device for use with a conventional deep fat frying basket to facilitate the frying of a porous mass of a food product located within said basket when said basket is immersed in a hot cooking liquid, said device comprising cover plate means arranged for disposition over the mouth of said basket to lock said food product therein and at least one projecting rod-like member, extending downward from said cover plate means into said basket for substantially the full depth thereof, said member including at least one longitudinally extending recessed face for facilitating the transfer of said hot cooking liquid through the interior of said mass.

2. The device of claim 1 comprising a pair of projecting rod-like members.

3. The device of claim 1 wherein said recess is concave.

4. The device of claim 1 additionally comprising handle means secured to said cover plate.

5. The device of claim 4 wherein said device is coated with a non-stick material.

6. The device of claim 1 wherein said cover plate is rectangular and includes respective fingers projecting from each corner for disposition on the mouth of said basket to hold said device in place on said mouth.

7. The device of claim 1 wherein said cover plate includes plural apertures therein.

8. The device of claim 1 wherein said device comprises a pair of projecting rod-like members each having at least one longitudinally extending recessed face and additionally comprising handle means secured to said cover plate means.

* * * * *